United States Patent
Nagao

(10) Patent No.: US 9,367,154 B2
(45) Date of Patent: Jun. 14, 2016

(54) MOBILE TERMINAL DEVICE HAVING FUNCTION OF FLIPPING MULTIPLE SCREENS BY OPERATIONS OF MULTIPLE TOUCHES AND DISPLAY CONTROL METHOD THEREOF

(75) Inventor: Yasutaka Nagao, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 94 days.

(21) Appl. No.: 13/993,307

(22) PCT Filed: Dec. 16, 2011

(86) PCT No.: PCT/JP2011/079204
§ 371 (c)(1),
(2), (4) Date: Jun. 11, 2013

(87) PCT Pub. No.: WO2012/081699
PCT Pub. Date: Jun. 21, 2012

(65) Prior Publication Data
US 2013/0271417 A1    Oct. 17, 2013

(30) Foreign Application Priority Data

Dec. 17, 2010    (JP) .................................. 2010-281882

(51) Int. Cl.
*G06F 3/041*    (2006.01)
*G06F 1/16*    (2006.01)
(Continued)

(52) U.S. Cl.
CPC .............. *G06F 3/041* (2013.01); *G06F 1/1616* (2013.01); *G06F 1/1641* (2013.01); *G06F 1/1643* (2013.01); *G06F 1/1647* (2013.01); *G06F 3/0483* (2013.01); *G06F 3/04883* (2013.01); *H04M 2250/16* (2013.01); *H04M 2250/22* (2013.01)

(58) Field of Classification Search
USPC ........................................................ 345/173
See application file for complete search history.

(56) References Cited

U.S. PATENT DOCUMENTS

| 2006/0197750 | A1 | 9/2006 | Kerr et al. |
| 2007/0152984 | A1 | 7/2007 | Ording et al. |
| 2007/0247441 | A1* | 10/2007 | Kim et al. ..................... 345/173 |

(Continued)

FOREIGN PATENT DOCUMENTS

| CN | 101866263 A | 10/2010 |
| JP | 08-076926 A | 3/1996 |

(Continued)

OTHER PUBLICATIONS

International Search Report (ISR) (PCT Form PCT/ISA/210), in PCT/JP2011/079204, dated Mar. 27, 2012.
Chinese Office Action dated Jul. 6, 2015 with English translation.

*Primary Examiner* — Long D Pham
(74) *Attorney, Agent, or Firm* — McGinn IP Law Group, PLLC.

(57) ABSTRACT

Provided is a mobile terminal device that includes a plurality of touch displays and a control unit. The control unit associatively controls screens displayed on the plurality of touch displays based on the number of simultaneous operations and operation directions. The number of simultaneous operations is the number of touch operations simultaneously carried out and accompanied by the movement of touch positions, and the operation directions are directions in which the touch positions of the touch operations have moved.

11 Claims, 6 Drawing Sheets

(51) Int. Cl.
*G06F 3/0488* (2013.01)
*G06F 3/0483* (2013.01)

(56) References Cited

U.S. PATENT DOCUMENTS

| | | |
|---|---|---|
| 2008/0036743 A1 | 2/2008 | Westerman et al. |
| 2010/0175018 A1* | 7/2010 | Petschnigg et al. ........... 715/776 |
| 2011/0018821 A1 | 1/2011 | Kii |
| 2011/0043527 A1 | 2/2011 | Ording et al. |
| 2011/0209057 A1* | 8/2011 | Hinckley .............. G06F 1/1641 715/702 |
| 2012/0105371 A1 | 5/2012 | Hotelling et al. |
| 2013/0106780 A1 | 5/2013 | Hotelling et al. |

FOREIGN PATENT DOCUMENTS

| | | |
|---|---|---|
| JP | 2007-533044 A | 11/2007 |
| JP | 2008-532185 A | 8/2008 |
| JP | 2009-522669 A | 6/2009 |
| JP | 2009-211547 A | 9/2009 |
| JP | 2010-517197 A | 5/2010 |
| JP | 2010-123082 A | 6/2010 |
| JP | 2010-250465 A | 11/2010 |
| WO | WO 2005/114369 A3 | 12/2005 |
| WO | WO 2006/096501 A1 | 9/2006 |
| WO | WO 2007/079425 A2 | 7/2007 |
| WO | WO 2008/094791 A2 | 8/2008 |

* cited by examiner

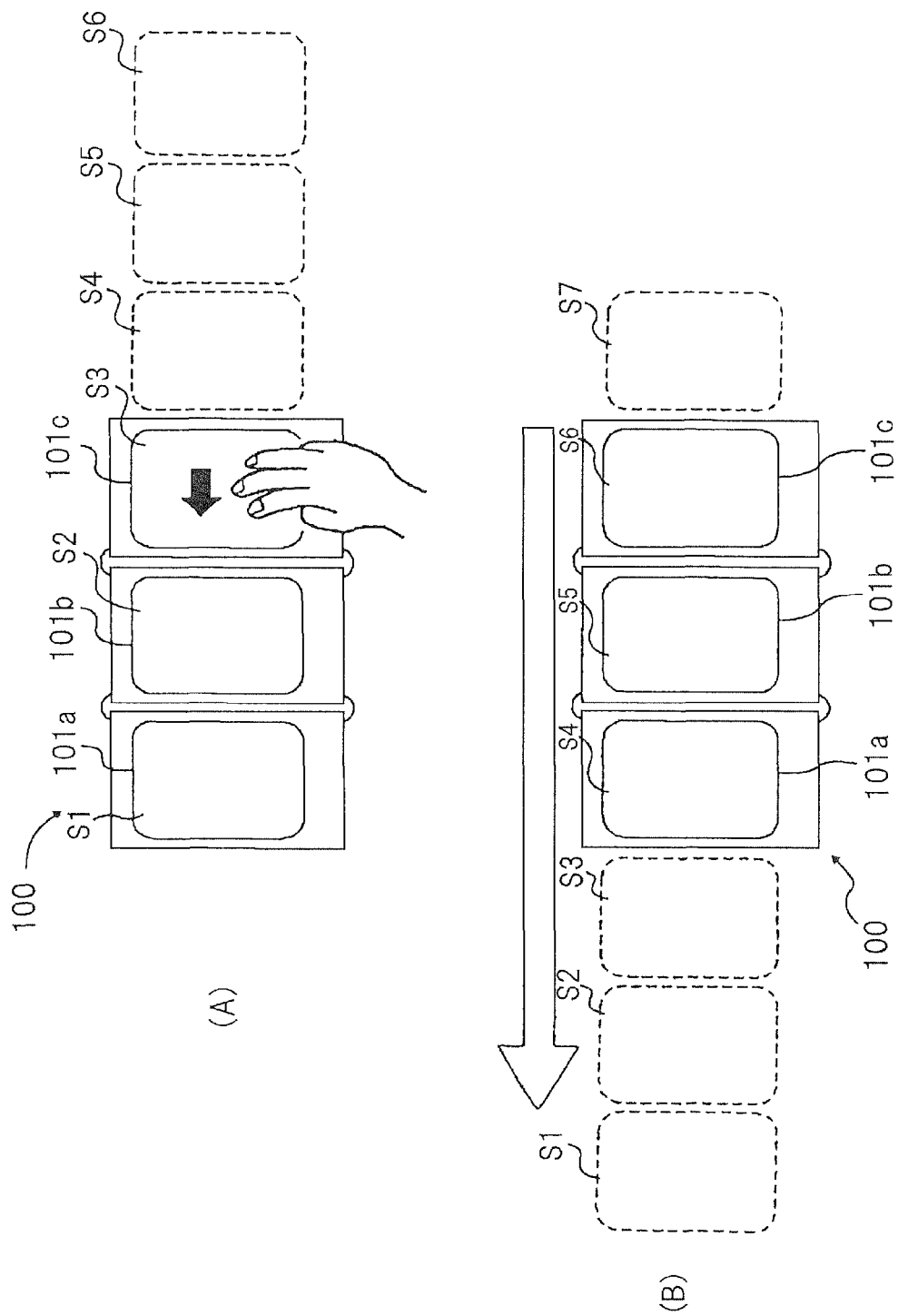

MOBILE TERMINAL DEVICE HAVING FUNCTION OF FLIPPING MULTIPLE SCREENS BY OPERATIONS OF MULTIPLE TOUCHES AND DISPLAY CONTROL METHOD THEREOF

TECHNICAL FIELD

The present invention relates to a mobile terminal device that includes a plurality of touch displays, and more particularly to a method for controlling its display.

BACKGROUND ART

Recently, the touch display that enables information to be input to a screen by touching has been employed for the mobile terminal device, thereby improving the usability of the mobile terminal device.

There is a mobile terminal device having a folded structure in which a plurality of cases are interconnected to be opened or closed via a hinge unit. By the folded structure, the mobile terminal device can be miniaturized and the portability and design of the mobile terminal device can be improved. There is also a sliding mobile terminal device where a plurality of cases are interconnect to be slid.

As the mobile terminal device that includes the plurality of cases, there has been offered a mobile terminal device designed in a manner in which a touch display is disposed in each of a plurality of cases (refer to Patent Literature 1). Patent Literature 1 proposes various touch operations for controlling the screens on the plurality of touch displays. For example, Patent Literature 1 describes screen movement where a continuous screen displayed on each touch display is sequentially moved by a flicking operation. Patent Literature 1 further describes screen switching. Specifically, by carrying out a tapping operation on one touch display and then on another touch display, the screens on the two touch displays are switched.

CITATION LIST

Patent Literature

Patent Literature 1: JP2009-211547A

SUMMARY OF INVENTION

Problems to be Solved by Invention

However, in the operation method described in Patent Literature 1, intuitive control may not be carried out by a single operation. For example, in the case in which two screens are to be moved, the flicking operation must be carried out twice. In the screen switching method, since the tapping operation is sequentially carried out on the two touch displays, the tapping operation must be carried out twice.

It is therefore an object of the present invention to provide a mobile terminal device capable of associatively controlling the screens on a plurality of touch displays of the mobile terminal device by one intuitive operation, a display control method, and a display control program.

Solution to Problem

To achieve the object, according to the present invention, a mobile terminal device includes:
  a plurality of touch displays; and
  a control unit that associatively controls screens displayed on the plurality of touch displays based on the number of simultaneous operations and operation directions. The number of simultaneous operations is the number of touch operations simultaneously carried out and accompanied by the movement of touch positions, and the operation directions are directions in which the touch positions of the touch operations have moved.

According to the present invention, a display control method of a mobile terminal device includes:
  measuring, when touch operations are carried out and accompanied by the movement of touch positions, the number of simultaneously carried out touch operations and operation directions in which the touch positions of the touch operations have moved; and
  associatively controlling screens displayed on the plurality of touch displays based on the number of simultaneous operations and the operation directions.

According to the present invention, a display control program includes:
  acquiring, when touch operations are carried out and accompanied by the movement of touch positions, information about the number of simultaneously carried out touch operations and information about operation directions in which the touch positions of the touch operations have moved; and
  associatively controlling screens displayed on the plurality of touch displays based on the information about the number of simultaneous operations and the information about the operation directions.

Effects of Invention

According to the present invention, the screens on the plurality of touch displays of the mobile terminal device can be associatively controlled by one intuitive operation.

BRIEF DESCRIPTION OF DRAWINGS

FIG. 7 Views each showing a sliding operation in a mobile terminal device that includes three touch displays.

REFERENCE NUMERALS

100 Mobile terminal device
100a, 100b Case
101, 101a to 101c Touch display
102 Hinge unit
103 Control unit

DESCRIPTION OF EMBODIMENTS

Now, an exemplary embodiment will be described in detail with reference to the drawings.

Figure 1:
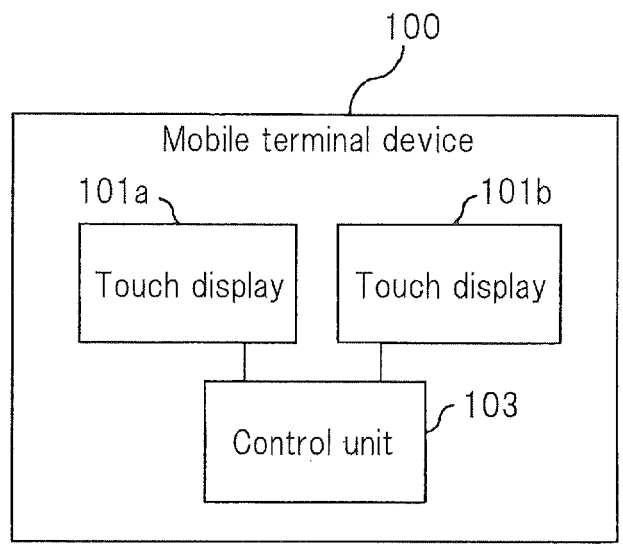
FIG. 1 A schematic block diagram showing the functional configuration of a mobile terminal device according to an embodiment of the present invention.

As shown in FIG. 1, mobile terminal device 100 according to the exemplary embodiment of the present invention includes touch displays 101a and 101b and control unit 103.

Figure 2:
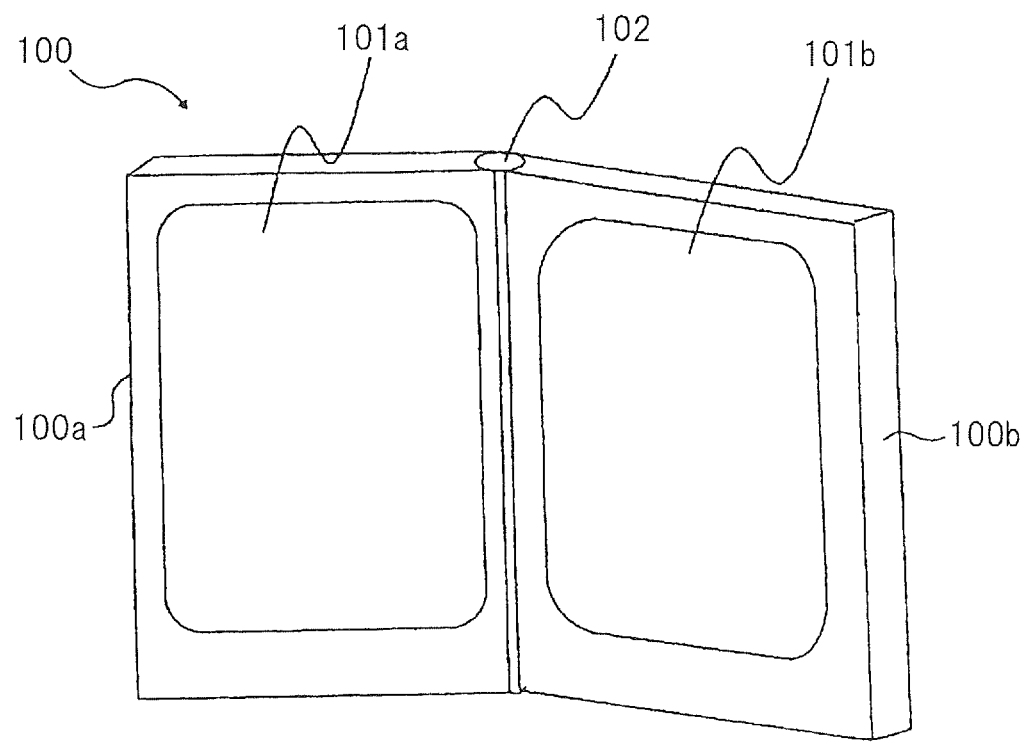
FIG. 2 A perspective view showing the appearance in the opened state of the mobile terminal device shown in FIG. 1.
Figure 3:
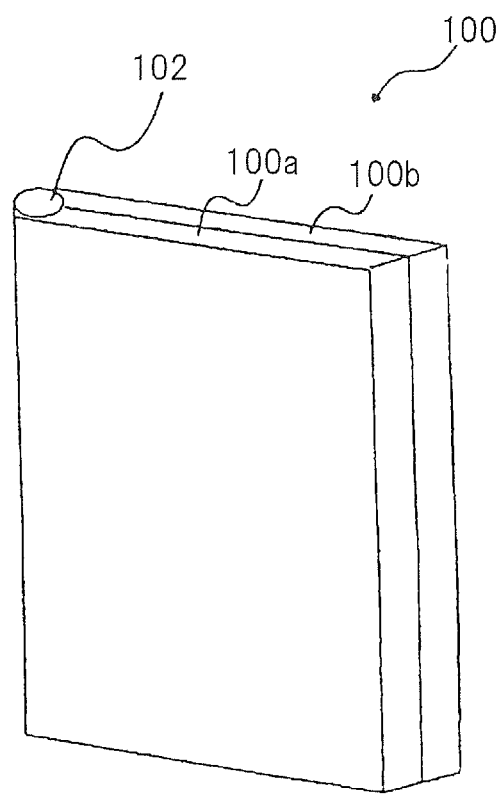
FIG. 3 A perspective view showing the appearance in the closed state of the mobile terminal device shown in FIG. 1.

As shown in FIGS. 2 and 3, mobile terminal device 100 according to the exemplary embodiment has a folded structure in which two cases 100a and 100b are interconnected to be opened or closed by hinge unit 102. Touch display 101a is mounted on case 100a, and touch display 101b is mounted on case 100b.

In the opened state, a user can operate touch displays 101a and 101b. In the closed state, touch displays 101a and 101b are protected from shocks and reduced in width, and thus the portability of the mobile terminal device is improved.

Each of touch displays 101a and 102b is a display input device that displays the screen of images or texts and that detects a user's touch operation and outputs information about a touch position.

Control unit 103, which is a control device which controls each unit (not shown) in mobile terminal device 100, executes processing according to the information about the touch positions from touch displays 101a and 101b, and controls screen displaying on touch displays 101a and 101b.

Control unit 103 acquires information about the number of simultaneous operations and information about operation directions from touch displays 101a and 101b, the number of simultaneous operations being the number of touch operations simultaneously carried out and accompanied by the movement of the touch positions, and the operation directions are directions in which the touch positions of the touch operations have moved. Control unit 103 then associatively controls screens displayed on two touch displays 101a and 101b based on these piece of information. The case of carrying out the plurality of touch operations includes a case where a plurality of touch operations is carried out on touch display 101a or 101b and a case where one touch operation is carried out on both of touch displays 101a and 101b.

Thus, since the display control of the screens is specified based on the number of a plurality of touch operations and the operation directions, the user can carry out associative control of the screens on the plurality of touch displays 101a and 101b by one intuitive operation using the number of fingers which corresponds to desired control.

For example, when a plurality of touch operations are simultaneously carried out in the displayed state of the series of screens on two touch displays 101a and 101b, if the operation directions of the plurality of touch operations are identical, control unit 103 moves the screens on two touch displays 101a and 101b by the number of screens equal to that of simultaneous operations in the operation directions. Hereinafter, the operation of moving the screens on touch displays 101a and 101b, as if turning pages, will be referred to as a "sliding operation".

This enables the user to select the amount by which a screen is to be moved based on the number of fingers for carrying out a touch operation such as a flickering operation or a dragging operation. Accordingly, with one intuitive operation, the user can move the screen by the amount that he/she desires. This is an intuitive operation not only because the touch operation such as a flickering operation is intuitive but also because the amount by which the screen is to be moved is determined based on the number of fingers touching the screen. Thus, the user does not need to acquire any special knowledge for moving the screen by the desired amount.

Control unit 103 can associatively control the screens on two touch displays 101a and 101b based on the number of simultaneous operations, touch display 101 where a plurality of touch operations have simultaneously been carried out, and a correlation in operation directions among the touch operations.

This enables specifying control based on the touch display where a plurality of touch operations have been carried out, the number of touch operations, and the correlation in operation directions. Thus, the cooperative control of the screens on the plurality of touch displays 101a and 101b can be realized by one intuitive operation.

For example, when two touch operations are simultaneously carried out on touch displays 101a and 101b and the directions of the two operations are not on the same straight line but are opposite to each other, control unit 103 can switch the screens on two touch displays 101a and 101b.

As a specific example, when the flickering operation of a direction toward touch display 101b is carried out on touch display 101a, and when simultaneously, the flickering operation of a direction not on the same straight line as that of the flickering operation on touch display 101a but toward touch display 101a is carried out on touch display 101b, the screens on two touch displays 101a and 101b are switched.

As another specific example, when two touch operations are simultaneously carried out on touch displays 101a and 101b, and when the directions of the two operations are vertical to the arranging direction of touch displays 101a and 101b and are opposite to each other, the screens on two touch displays 101a and 101b are switched.

Hereinafter, the operation of switching the screens on touch displays 101a and 101b will be referred to as a "switching operation".

Through this switching operation, the user can switch the screens by one intuitive operation, namely, a flickering operation to add twists to two touch displays 101a and 101b.

Hereinafter, the transition states of the screens in the "sliding operation" and the "switching operation" will be described.

Sliding Operation

Figure 4:
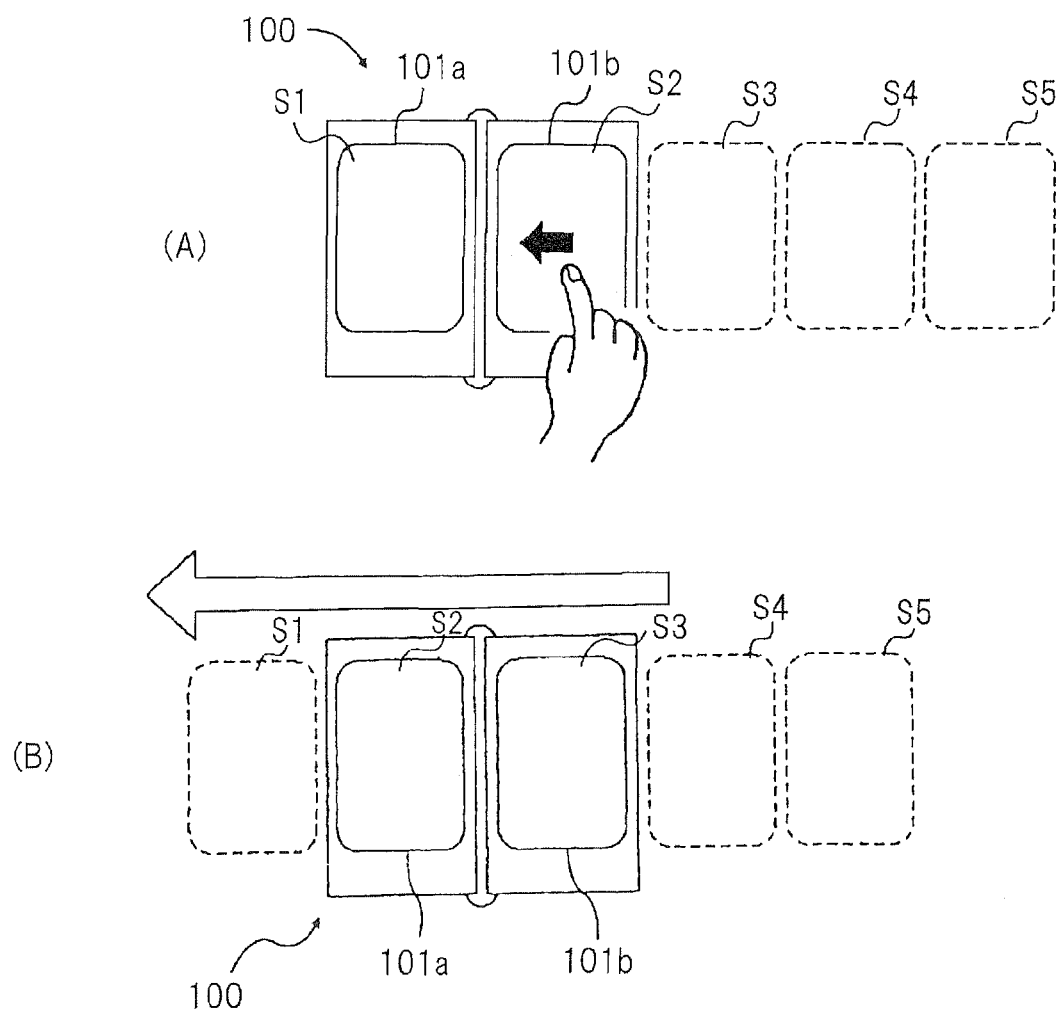
FIG. 4 Views each showing the state of moving the screens displayed on two touch displays by the amount of one screen.

FIG. 4 indicates views each showing the state of moving the screens displayed on two touch displays by the amount of one screen. As an example, there is a series of screen data, namely, screens S1 to S5 and, in a state shown in FIG. 4A, screen S1 is displayed on touch display 101a, and screen S2 is displayed on touch display 101b.

In the state shown in FIG. 4A, when the user carries out a flickering operation of a left direction on touch display 101a or 101b by one finger, screens S1 to S5 are sequentially moved left by one screen on touch displays 101a and 101b. As a result, as shown in FIG. 4B, screen S2 is displayed on touch display 101a, and screen S3 is displayed on touch display 101b.

Figure 5:
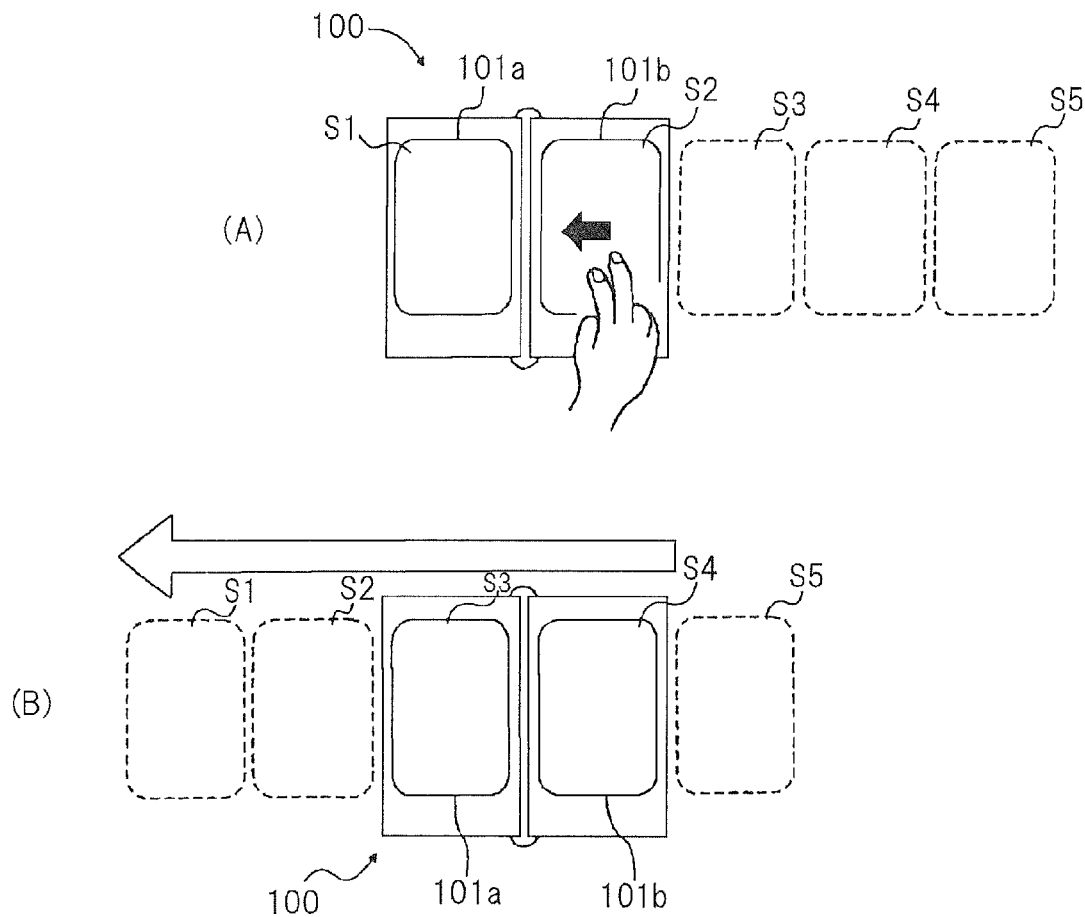
FIG. 5 Views each showing the state of moving the screens displayed on the two touch displays by the amount of two screens.

FIG. 5 indicates views each showing the state of moving the screens displayed on two touch displays by the amount of two screens. As an example, there is a series of screen data, namely, screens S1 to S5 and, in a state shown in FIG. 5A, screen S1 is displayed on touch display 101a, and screen S2 is displayed on touch display 101b.

In the state shown in FIG. 5A, when the user carries out a flickering operation of a left direction on touch display 101a or 101b, for example, touch display 101a, by two fingers, screens S1 to S5 are sequentially moved left by two screens on touch displays 101a and 101b. As a result, as shown in FIG. 5B, screen S3 is displayed on touch display 101a, and screen S4 is displayed on touch display 101b.

Thus, according to the embodiment, with one intuitive operation, the user can move the screen by the amount that he/she desires. Further, as compared with the case of changing the amount by which a screen is to be moved according to flickering intensity or a moving distance, the amount, that is explicitly designated by a user, by which the screen is to be moved can surely be executed.

The example of the left flickering operation has been described. However, the present invention is not limited to this. When the user carries out a flickering operation right by a predetermined number of fingers, the screens on touch displays 101a and 101b are moved right by an amount that is determined according to the number of fingers.

The example where the screens on touch displays 101a and 101b are similarly moved on whichever of tough displays 101a and 101b the flickering operation is carried out has been described. However, the present invention is not limited to this. The screens on touch displays 101a and 101b may be associatively moved left in the case of a left flickering operation on right touch display 101b, and a different operation may be carried out in the case of a left flickering operation on left touch display 101b. The screens on touch displays 101a and 101b may be more easily imagined to be associatively moved in the left flickering operation on right touch display 101b than in the left flickering operation on left touch display 101b. Thus, another operation can be used for the other operation by executing cooperative movement through a more intuitive operation.

As examples of the sliding operations, the case of executing the flickering operation by one finger and the case of executing the flickering operation by two fingers have been described. However, the present invention is not limited to this. When a flickering operation is carried out by three, four or five fingers, control unit 103 may move the screen by the amount of three, four or five screens.

Switching Operation

As the example of a switching operation, when the user simultaneously carries out the flickering operations of opposite directions not on the same straight line on two touch displays 101a and 101b, control unit 103 switches the screen on touch display 101a and the screen on touch display 101b. This is based on the assumption of several patterns of one intuitive touch operation carried out when the screens on touch displays 101a and 101b are switched. Such a determination method enables switching of the screens when various touch operations are carried out.

Figure 6A:
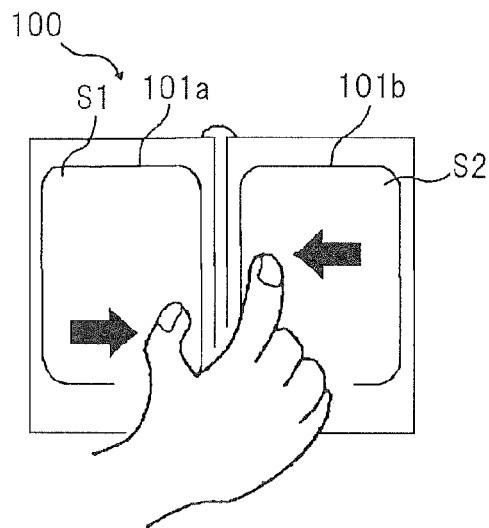
FIG. 6A A view showing the state of switching the screens on the two touch displays by a first operation.

FIG. 6A shows the state of switching the screens on the two touch displays by a first operation. The user simultaneously carries out a right flickering operation on touch display 101a and a left flickering operation on touch display 101b. These flickering operations are not on the same straight line but are opposite to each other, and are set in a parallel or twisted relationship. The user can switch the screens by such one intuitive touch operation.

Figure 6B:
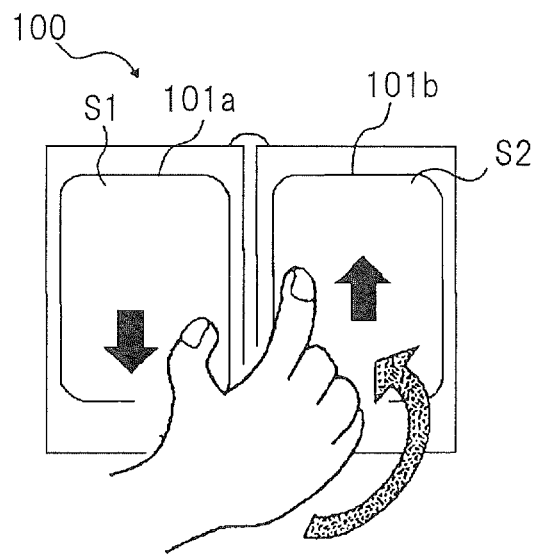
FIG. 6B A view showing the state of switching the screens on the two touch displays by a second operation.

FIG. 6B shows the state of switching the screens on the two touch displays by a second operation. The user simultaneously carries out a downward flickering operation on touch display 101a and an upward flickering operation on touch display 101b. These flickering operations are carried out on different touch displays 101a and 101b, and thus they are not on the same straight line but are opposite to each other, and are set in a parallel or twisted relationship. The user can switch the screens by such one intuitive touch operation.

Figure 6C:
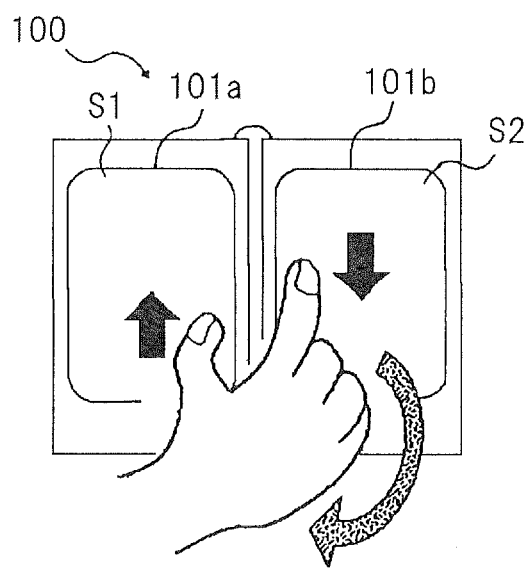
FIG. 6C A view showing the state of switching the screens on the two touch displays by a third operation.

FIG. 6C shows the state of switching the screens on the two touch displays by a third operation. The user simultaneously carries out an upward flickering operation on touch display 101a and a downward flickering operation on touch display 101b. These flickering operations are carried out on different touch displays 101a and 101b, and thus they are not on the same straight line but are opposite to each other, and are set in a parallel or twisted relationship. The user can switch the screens by such one intuitive touch operation.

Mobile terminal device 100 including two touch displays 101a and 101b according to the embodiment has been described. However, the embodiment is in no way limitative of the present invention. The present invention can be applied to a mobile terminal device including three or more touch displays.

FIG. 7 indicates views each showing a sliding operation in a mobile terminal device that includes three touch displays. In mobile terminal device 100 that includes three touch displays 101a to 101c, as in the case shown in FIG. 3, control unit 103 controls the displaying of screens on touch displays 101a to 101c by carrying out a processing operation based on information about the touch positions of touch displays 101a to 101c.

As an example, there is a series of screen data, namely, screens S1 to S6 and, in a state shown in FIG. 7A, screen S1 is displayed on touch display 101a, screen S2 is displayed on touch display 101b, and screen S3 is displayed on touch display 101c.

In the state shown in FIG. 7A, when the user carries out a flickering operation in a left direction on one of touch displays 101a to 101c, e.g., touch screen 101a, by three fingers, screens S1 to S6 are sequentially moved left by the amount of three screens on touch displays 101a to 101c. As a result, as shown in FIG. 7B, screen S4 is displayed on touch display 101a, screen S5 is displayed on touch display 101b, and screen S6 is displayed on touch display 101c.

The example of moving, with the three-finger flickering operation, the screens by the amount of three screens has been described. However, the present invention is not limited to this. Similarly, when a one-finger flickering operation is carried out, control unit 103 moves the screen by the amount of one screen. When a two-finger flickering operation is carried out, control unit 103 moves the screen by the amount of two screens. Further, when a four or five-finger flickering operation is carried out, control unit 103 may move the screen by the amount of four or five screens.

Control unit 103 of mobile terminal device 100 of each of the embodiments can be configured such that a program for realizing its function is recorded in a computer readable recording medium and the computer reads the program recorded in the recording medium to execute it. The computer readable recording medium is a recording medium such as a flexible disk, a magneto-optical disk, or a CD-ROM, or a storage device such as a hard disk drive included in a computer system.

The present invention has been described by way of preferred embodiment using specific terms. However, the embodiment is only an example. It should be understood that various changes and modifications can be made without departing from the scope of the appended claims.

This application claims priority from Japanese Patent Application No. 2010-281882 filed Dec. 17, 2010, which is hereby incorporated by reference herein in its entirety.

The invention claimed is:

1. A mobile terminal device, comprising:
a plurality of touch displays; and
a control unit that associatively controls screens displayed on the plurality of touch displays based on a number of simultaneous operations and operation directions, the number of simultaneous operations being a number of touch operations simultaneously carried out and accompanied by a movement of touch positions, and the operation directions being directions in which the touch positions of the touch operations have moved, wherein the control unit holds screen data that includes a series of screens that are displayed in a predetermined order, wherein, when operation directions of a plurality of touch operations that are simultaneously carried out in a display state in which a part of the series of screens is displayed on the plurality of touch displays, are identical, based on the order of the screen data, the control unit moves the screens to be displayed on the plurality of touch displays by a number of screens equal to the number of simultaneous operations in the operation directions, and wherein the control unit is configured to move the screens to be displayed on the plurality of touch displays when the number of screens and the number of simultaneous operations is three or more.

2. The mobile terminal device according to claim 1, wherein the control unit associatively controls the screens of the plurality of touch displays based on at least one of a correlation among the number of simultaneous operations, the touch displays on which the plurality of touch operations have simultaneously been carried out, and the operation directions.

3. The mobile terminal device according to claim 2, wherein, when the number of simultaneous operations is two, when two touch operations are carried out on different touch displays, and when the two operation directions are opposite to each other, the control unit switches screens of the two touch-operated touch displays.

4. The mobile terminal device according to claim 1, wherein, when the number of simultaneous operations is two, when two touch operations are carried out on different touch displays, and when the two operation directions are opposite to each other, the control unit switches screens of the two touch-operated touch displays.

5. The mobile terminal device according to claim 1, wherein the number of screens and the number of simultaneous operations is three or more.

6. The mobile terminal device according to claim 1, wherein the control unit moves the screens to be displayed on the plurality of touch displays by the number of screens equal to the number of simultaneous operations in the operation directions.

7. A display control method of a mobile terminal device, said method comprising:

measuring, when touch operations are carried out and are accompanied by a movement of touch positions, a number of simultaneously carried out touch operations and operation directions in which the touch positions of the touch operations have moved; and associatively controlling screens displayed on a plurality of touch displays based on the number of simultaneous operations and the operation directions, wherein the associatively controlling includes:

holding screen data that includes a series of screens that are displayed in a predetermined order;

when operation directions of a plurality of touch operations that are simultaneously carried out in a display state in which a part of the series of screens is displayed on the plurality of touch displays, are identical, based on the order of the screen data, moving the screens to be displayed on the plurality of touch displays by a number of screens equal to the number of simultaneous operations in the operation directions; and moving the screens to be displayed on the plurality of touch displays when the number of screens and the number of simultaneous operations is three or more.

8. The display control method of the mobile terminal device according to claim 7, wherein the associatively controlling includes associatively controlling the screens of the plurality of touch displays based on a correlation among the number of simultaneous operations, the touch displays on which the plurality of touch operations have simultaneously been carried out, and the operation directions.

9. The display control method of the mobile terminal device according to claim 8, wherein the associatively controlling further includes switching screens of two touch-operated touch displays, when the number of simultaneous operations is two, two touch operations are carried out on different touch displays, and the two operation directions are not on a same straight line but are opposite to each other.

10. The display control method of the mobile ten final device according to claim 7, wherein the associatively controlling includes switching screens of two touch-operated touch displays, when the number of simultaneous operations is two, two touch operations are carried out on different touch displays, and the two operation directions are not on a same straight line but are opposite to each other.

11. A non-transitory computer readable storage medium with a display control program used in a computer of a mobile terminal device that includes a plurality of touch displays, said program being for causing the computer to execute:

acquiring, when touch operations are carried out and accompanied by a movement of touch positions, information about a number of simultaneously carried out touch operations and information about operation directions in which the touch positions of the touch operations have moved; and associatively controlling screens displayed on the plurality of touch displays based on the information about the number of simultaneous operations and the information about the operation directions, wherein the associatively controlling includes:

holding screen data that includes a series of screens that are displayed in a predetermined order;

when operation directions of a plurality of touch operations that are simultaneously carried out in a display state in which a part of the series of screens is displayed on the plurality of touch displays, are identical, based on the order of the screen data, moving the screens to be displayed on the plurality of touch displays by a number of screens equal to the number of simultaneous operations in the operation directions; and moving the screens to be displayed on the plurality of touch displays when the number of screens and the number of simultaneous operations is three or more.

* * * * *